June 13, 1950　　　A. H. SWETT, JR., ET AL　　　2,511,751
LOCK SEAL
Filed March 4, 1947　　　　　　　　　　　　2 Sheets-Sheet 1
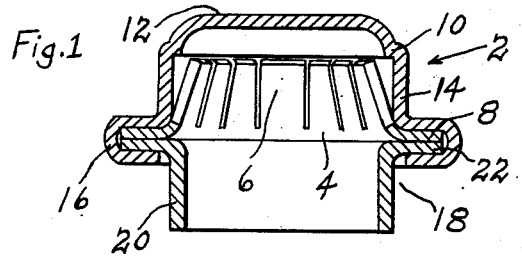
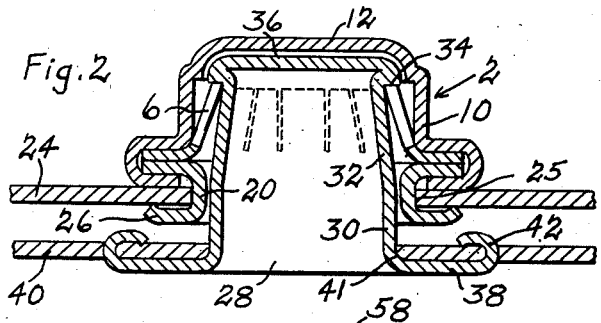
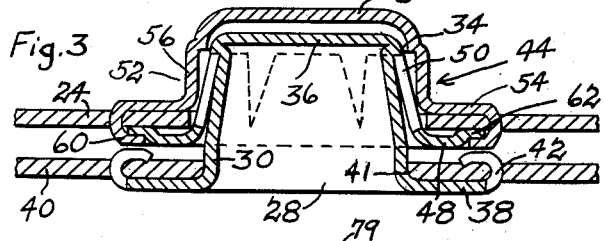
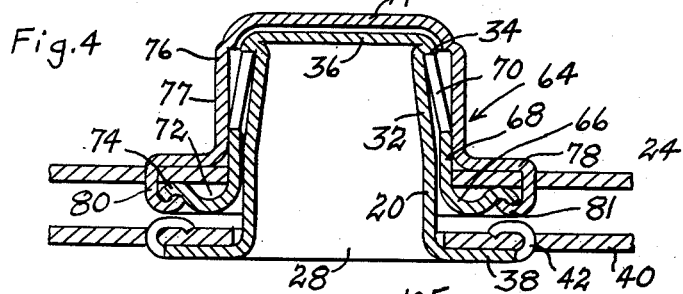
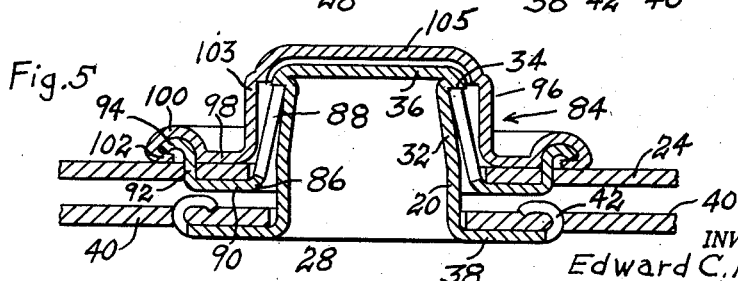
INVENTORS
Edward C. Marshall
and
BY Arthur H. Swett, Jr.
Alfred W. Vibber
ATTORNEY June 13, 1950  A. H. SWETT, JR., ET AL  2,511,751
LOCK SEAL
Filed March 4, 1947  2 Sheets-Sheet 2
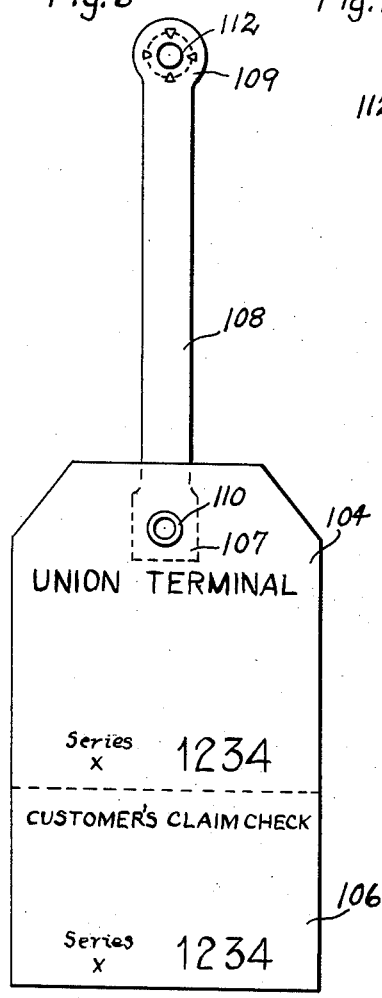
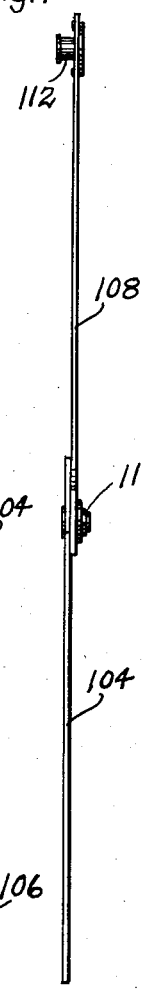
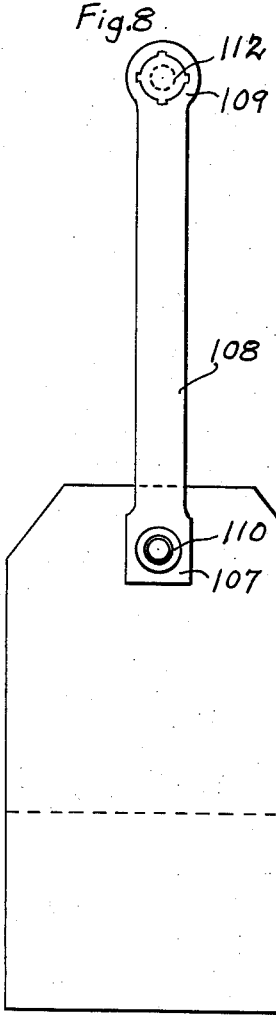
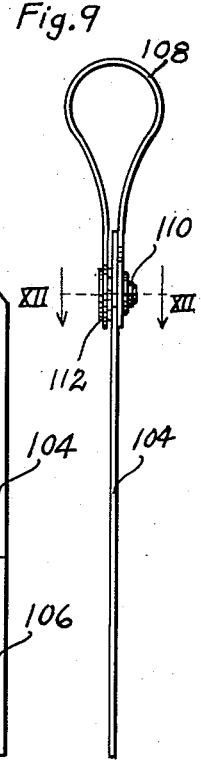
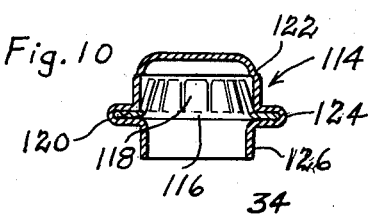
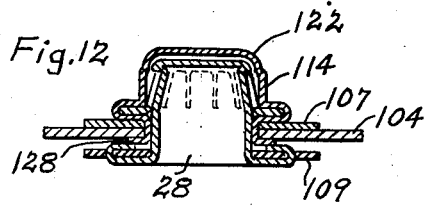
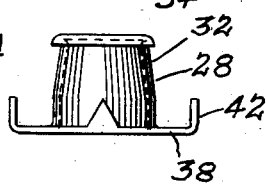
INVENTORS
Edward C. Marshall
and
BY Arthur H. Swett, Jr.
Alfred W. Vibber
ATTORNEY Patented June 13, 1950

2,511,751

UNITED STATES PATENT OFFICE 2,511,751

LOCK SEAL

Arthur H. Swett, Jr., and Edward C. Marshall, Montclair, N. J., assignors to American Tag Company of New Jersey, Belleville, N. J., a corporation of New Jersey Application March 4, 1947, Serial No. 732,178

9 Claims. (Cl. 292—319)

This invention relates to lock seals for use in connection with various articles which it is desired to guard against opening without detection.

It is an object of the invention to provide an improved lock seal, the construction of which precludes tampering therewith either before or after its sealing. As a result of such improved construction, the lock seal cannot be unfastened without the destruction of, or at least detectable injury to, the article to which it is affixed.

It is a further object of the invention to provide a tamper-proof lock seal of the type described which is simple and inexpensive to manufacture.

These and further objects and advantages of the invention will appear in the following description of preferred embodiments thereof.

The invention will be more readily understood by reference to the accompanying drawings in which:

Figure 1 is a view in vertical cross-section through one embodiment of the female member of the lock seal;

Figure 2 is a view in vertical cross-section through a complete lock seal device with the male and female parts thereof in locked relationship, the female part being that shown in Figure 1 after attachment to an article;

Figure 3 is a view in vertical cross-section of an assembled lock seal, the female member thereof being a modification of that shown in Figures 1 and 2;

Figure 4 is a view similar to Figures 2 and 3 showing a lock seal with a still further modification of the female member;

Figure 5 is a view in vertical cross-section through an assembled lock seal, the female member of such assembly, which is presently preferred, being of yet another modified form;

Figure 6 is a view in front elevation of a baggage or luggage tag employing the lock seal of the invention;

Figure 7 is a view in side elevation of such luggage tag;

Figure 8 is a view in rear elevation of the tag shown in Figures 6 and 7;

Figure 9 is a view in side elevation of the tag showing the position which the parts assume when the lock seal is locked;

Figure 10 is a view in vertical section through a fifth modification of the female member of the lock seal;

Figure 11 is a view in side elevation of a male member for cooperation therewith; and Figure 12 is a view in cross-section through the axis of the locked seal shown in Figure 9, the section being taken along the line XII—XII in Figure 9.

The lock seal of the invention is shown in Figures 6 to 9, inclusive, and 12 as being used on a luggage tag to prevent the removal of such tag from the article to which it is affixed without destroying or at least tearing such article in a detectable manner. It is the practice in some railway terminals to sell such tags or checks to the porters, who then resell them at a higher price to the customer, attaching the tag to the luggage piece and giving the customer the stub or customer's claim check detached from the body of the tag. With prior lock seals employed on such tags, it has been possible, because the structure of such seals permitted access to the locking mechanism, to deform such locking mechanism either before or after the parts of the lock seal were put together, allowing the lock seal parts to be separated without injury to the members to which the parts thereof have been attached. Such tampering could easily be done with a thin instrument, such as a pen knife. Thus prior lock seals of the type described have failed, at least to some degree, in their intended function of making opening of the lock seal detectable.

The lock seal of the present invention, which may be used to advantage on a great variety of articles, such as envelopes, price tags, etc., as well as luggage checks, is so constructed that access to the locking mechanism of the lock seal through the female member, the male member, or the space between such members when they are assembled and locked, is prevented. Thus the seal cannot be opened unless one or more of its two major component parts is removed from the article or articles to which such parts are attached or if such article or articles themselves are injured or destroyed.

The first embodiment of the female member shown in Figure 1 is designated generally by the reference character 2. Such member includes a generally annular internal locking member 4, formed of material which can spring somewhat, having an upper frusto-conical portion cut into separate prongs 6. The lower portion of member 4 is formed with a horizontal outwardly extending flange 8, by which the member is attached to the outer protective hood or cover member 10. Such cover member has a closed top 12, vertical cylindrical side walls 14, and a lower closed flanged portion 16 so formed as to have an inwardly facing annular groove therein. An attaching eyelet 18 having a lower cylindrical portion 20 is attached to member 2 by outwardly directed horizontal flange 22 on the upper end thereof, flange 22 abutting flange 8 of the inner locking member and being tightly gripped within the groove in flange 16 of the cover member, as shown.

In Figure 2 the female member 2 of the Figure 1 is shown attached to a member 24, which may be of cardboard or the like by having the lower eyelet member thrust through a hole 25 in member 24, the lower end of the eyelet being bent into a lower horizontal flanged portion as shown at 26. A male member 28 of the lock seal is shown in locked engagement with the female member. The male member is affixed to a member 40 which may likewise be made of cardboard, by being thrust through a hole 41 in the latter as shown, the lower horizontal outwardly directed flange 38 abutting the underside of member 40. The male member is retained in such member 40 by a series of discontinuous tangs 42 which pierce member 40 and are bent over as shown. The male member is provided with a stem or neck portion consisting of a cylindrical wall portion 30 joined to an upper wall portion 32 of frusto-conical shape. At the end of the stem, specifically at the top of wall portion 32, there is positioned an annular bead forming a continuous substantially right angular shoulder 34 for cooperation with the upper ends of prongs 6. The male member is covered by the closed horizontal top 36 which prevents access to the shoulder 34, and prongs 6 through the interior of the male member.

When male member 28 is inserted in female member 2, the arcuate portion at the edge of the top 36 of the male member, upon contact with prongs 6, cams them outwardly so that they assume a substantially vertical position in the space provided for them in cover member 10. The male member thus may be inserted into the female member for substantially its full extent. When shoulder 34 advances past the upper ends of prongs 6, however, such prongs, which are made of metal, which is at least somewhat springy, spring inwardly toward the axis of the lock seal to the position shown in Figure 2, thus preventing the withdrawal of the male member.

The three embodiments of the lock seal of the invention shown in Figures 3, 4, and 5, respectively, are somewhat to be preferred to that shown in Figure 2, since the female member is more protected against tampering in that portion interlocking with the member on which it is affixed. The male member in each of these embodiments is generally similar to that shown in Figure 2, with the exception that those in Figures 3 and 5 are somewhat shorter than that employed in Figures 2 and 4. The same reference characters are used to designate the male members and parts thereof in Figures 2 to 5, inclusive.

In Figure 3 the female member, generally designated 44, has an internal locking member 48 therein, such member having an upper frusto-conical portion provided with separate prongs 50. The protective hood or cover member 52 is provided with an outwardly extending horizontal flange 54 which seats upon member 24 to which it is attached, a vertical side wall portion 56, and a generally horizontally extending cap portion 58. The outer edge of flange 54 is provided with spaced tangs 60 which extend downwardly through member 24 and are bent horizontally inwardly, tightly to engage the upwardly offset edge 62 on the flange member 48 of the internal locking member.

The female member 64 shown in Figure 4 is provided with an inner locking member 66 having an upstanding cylindrical portion 68 which is joined to the frusto-conical upper portion provided with the prongs 70. Below cylindrical portion 68 the locking member is provided with a downwardly convex, outwardly extending flange portion 72, which joins the downwardly concave outer edge 74 of such member. The outer protective hood or cap member 76 is provided with a cylindrical side wall portion 77 and with a horizontal cap 79, such outer protective member being affixed to member 24 and to the inner locking member by the horizontal flange 78 which is provided with a series of spaced tangs 80. Such tangs pierce member 24 and then are bent upwardly tightly into contact at 81 with the downwardly concave outer edge portion 74 of the inner locking member.

In the embodiments of the lock seal of the invention above described, as well as those presently to be described, the two members to be sealed lie close together when the male and female members of the lock seal are lockingly engaged, as is evident in Figures 2 to 5, inclusive, and 12. In those embodiments shown in Figures 3 and 4, and described above, when the male and female parts are lockingly engaged the upper surfaces of the inbent ends of tangs 42 on the flange 38 of the male member lie close to the lower surfaces of the inbent ends of tangs 60 and 80, respectively, on the flanges 54 and 78, respectively, of the cap of the female member, and to the lower surface of the flanges 48 and 66, respectively, of the locking member. By reason of such proximity of the thus confronting parts of the attaching means for the male and for the female member in the embodiments of Figures 3 and 4 it is difficult, if not impossible, to insert between them a tool which would have any appreciable effect in loosening the bent tangs or in prying outwardly the prongs of the locking member. Furthermore, the fact that the outer ends of the attaching tangs on both the male and female members are bent inwardly makes it impossible for one, using such tool, to engage the outer ends of such tangs and even to loosen them, let alone disengage them, from the members which they engage and to which they fasten the corresponding lock seal part.

The construction of the female locking member shown in Figure 5 is that which is presently preferred because of its ease of assembly and the protection it affords the attachment of the female member on the member on which it is used. Such female member, generally designated 84, is provided with the inner locking member 86 having the upper frusto-conical annular section provided with separate prongs 88. The inner locking member has a bottom horizontal flange 90 on the outer end of which are provided spaced tangs 92 which extend vertically upwardly through member 24. The outer protective hood 96 is provided with a bottom horizontal flange 98 joined on its outer edge to the downwardly concave portion 100 which ends in the inwardly bent horizontal portion 102. Protective hood 96 is further provided with the cylindrical sidewall 103 and the horizontal cap 105. The female member is assembled by placing the protective hood on member 24 coaxially of the hole punched therethrough and then placing the inner locking member within it, such last member being forced upwardly so that tangs 92 pierce member 24 and are clinched over as shown in the cavity formed by the portions 100 and 102 of the protective hood.

A typical manner of use of the lock seal of the present invention is shown here in Figures 6 to 9, inclusive, and 12. The luggage check or tag shown has a main body portion 104 on the bottom of which is attached the separable claim check 106, the paper preferably being scored between such parts. The tongue member 108, formed separately, is attached at its bottom end 107 to the upper end of body portion 104 by means of the female member 110 of the lock seal assembly, which has its open end facing outwardly of the paper in Figure 6. Carried on the upper end 109 of the tongue is the male member 112 of the lock seal assembly, the shouldered stem of such member facing outwardly of the paper in Figure 6. As shown in Figure 9, the tongue 108 may be looped around an article (not shown) such as the handle of a valise and the lock seal parts locked together. When thus locked the tag cannot be removed except by tearing tongue 108.

In Figure 10 there is shown a fifth embodiment of the female member which may be employed with the male member 28 shown in Figure 11 in confronting relationship thereto. Male member 28 is the same as that shown in Figures 2 to 5, inclusive, and its parts are designated by the same reference characters. The female member 114, shown in Figure 10, is essentially the same as member 2, shown in Figure 2, with the exception that the lower attaching eyelet 126 is integral with the protective cover 122. The inner locking member 116, having prongs 118 disposed along the frustum of a cone, is provided with the outwardly extending flange 120 which is retained by being clinched in the portion of the cover having the double flange 124.

In Figure 12 there is shown in cross-section the lock seal assembly of the parts shown in Figures 10 and 11 in the positions they assume when they are employed in the baggage check illustrated in Figures 6 to 9, inclusive, and are locked together. The lower portion of attaching eyelet 126 which has been flanged over the edges of the hole through tongue portion 107 is designated 128.

We have fully described preferred embodiments of the lock seal of our invention and a typical manner of use thereof. It will be understood that the lock seal of the invention is capable of considerable variation as to details and that it may be used to advantage with a variety of different articles, as indicated. The scope of the invention is, therefore, to be defined by the following claims.

We claim as new the following:

1. The combination of a sheet-like member and a female part of a lock seal, the female part comprising a continuous tubular locking member, said locking member having a plurality of upwardly extending prongs affixed thereto at their lower ends, said prongs lying generally on the frustum of a cone so as to extend inwardly toward the axis of the locking member, the prongs being spaced to provide a shank receiving opening, a protective hood in the form of an inverted cup coaxial with the locking member to cover substantially all but the lower, shank receiving, end of the locking member, and means for connecting the hood to the locking member and to the sheet-like member, said last named means including an outwardly directed flange on the bottom of the hood and an outwardly directed flange on the bottom of the locking member, the locking member being inserted upwardly through an aperture in the sheet-like member, the flanges on the hood and locking member being affixed on opposite sides of the sheet-like member, one of such flanges having spaced tangs piercing such sheet-like member, the outer ends of the tangs contacting and interlocking with the other edge of the other flange.

2. The combination of a sheet-like member and a female part of a lock seal, the female part comprising a continuous tubular locking member, said locking member having a plurality of upwardly extending prongs affixed thereto at their lower ends, said prongs lying generally on the frustum of a cone so as to extend inwardly toward the axis of the locking member, the prongs being spaced to provide a shank receiving opening, a protective hood in the form of an inverted cup coaxial with the locking member to cover substantially all but the lower, shank receiving, end of the locking member, and means for connecting the hood to the locking member and to the sheet-like member, said last named means including an outwardly directed horizontal flange on the bottom of the hood and an outwardly directed horizontal flange on the bottom of the locking member, the locking member being inserted upwardly through an aperture in the sheet-like member, the flange on the hood being positioned on top of such sheet-like member and the flange on the locking member being positioned on the bottom of such sheet-like member, the flange on the hood having spaced tangs downwardly piercing such sheet-like member, the outer ends of the tangs contacting and interlocking with the outer edge of the flange on the locking member.

3. The combination of a sheet-like member and a female part of a lock seal, the female part comprising a continuous tubular locking member, said locking member having a plurality of upwardly extending prongs affixed thereto at their lower ends, said prongs lying generally on the frustum of a cone so as to extend inwardly toward the axis of the locking member, the prongs being spaced to provide a shank receiving opening, a protective hood in the form of an inverted cup coaxial with the locking member to cover substantially all but the lower, shank receiving, end of the locking member, and means for connecting the hood to the locking member and to the sheet-like member, said last named means including an outwardly directed horizontal flange on the bottom of the hood and an outwardly directed horizontal flange on the bottom of the locking member, the locking member being inserted upwardly through an aperture in the sheet-like member, the flange on the hood being positioned on top of such sheet-like member and the flange on the locking member being positioned on the bottom of such sheet-like member, the flange on the hood having spaced tangs downwardly piercing such sheet-like member, the outer ends of the tangs being bent inwardly in a direction generally radial of the female part to overlie and tightly engage the outer edge of the flange of the locking member, such edge of the last named flange having an offset upwardly at the points of contact between it and the tangs so that the side and end edges of the tangs lie substantially flush with the main bottom surface of said flange on the locking member.

4. The combination of a sheet-like member and a female part of a lock seal, the female part comprising a continuous tubular locking member, said locking member having a plurality of upwardly extending prongs affixed thereto at their lower ends, said prongs lying generally on the frustum of a cone so as to extend inwardly toward the axis of the locking member, the prongs being spaced to provide a shank receiving opening, a protective hood in the form of an inverted cup coaxial with the locking member to cover substantially all but the lower, shank receiving, end of the locking member, and means for connecting the hood to the locking member and to the sheet-like member, said last named means including an outwardly directed horizontal flange on the bottom of the hood and an outwardly directed horizontal flange on the bottom of the locking member, the locking member being inserted upwardly through an aperture in the sheet-like member, the flange on the hood being positioned on top of such sheet-like member and the flange on the locking member being positioned on the bottom of such sheet-like member, the flange on the hood having spaced tangs downwardly piercing such sheet-like member, the outer edge of the flange on the locking member being bent concavely downwardly at locations where the flange confronts the tangs, the outer ends of the tangs being bent upwardly into such upwardly bent portions of the flange to tightly engage the same and so that the outer edges of the tangs lie vertically above the main bottom surface of the flange on the locking member.

5. The combination of a sheet-like member and a female part of a lock seal, the female part comprising a continuous tubular locking member, said locking member having a plurality of upwardly extending prongs affixed thereto at their lower ends, said prongs lying generally on the frustum of a cone so as to extend inwardly toward the axis of the locking member, the prongs being spaced to provide a shank receiving opening, a protective hood in the form of an inverted cup coaxial with the locking member to cover substantially all but the lower, shank receiving, end of the locking member, and means for connecting the hood to the locking member and to the sheet-like member, said last named means including an outwardly directed horizontal flange on the bottom of the hood and an outwardly directed horizontal flange on the bottom of the locking member, the locking member being inserted upwardly through an aperture in the sheet-like member, the flange on the hood being positioned on top of such sheet-like member and the flange on the locking member being positioned on the bottom of such sheet-like member, the flange on the locking member having spaced tangs upwardly piercing such sheet-like member, the outer ends of the tangs contacting and interlocking with the outer edge of the flange on the hood.

6. In the combination of a first member and a second member to be sealed thereto and a lock seal having a male part and a female part, one such part being affixed to the first member and the other such part being affixed to the second member, the improved lock seal in which the male part has an upstanding neck portion, said neck portion having a substantially downwardly facing shoulder near a first end thereof, the first member being affixed to the end of the male part remote from the shoulder, the neck of the male portion extending substantially at right angles to the extent of the first member, and the female part comprises a continuous tubular locking member having a bottom diameter slightly larger than that of the largest portion of the neck so as to receive the neck within it, said locking member having a plurality of upwardly extending prongs affixed thereto at their lower ends, said prongs lying generally on the frustum of a cone so as to extend inwardly toward the axis of the locking member, whereby when the male member is inserted upwardly into the female member the top edges of the prongs engage the shoulder on said neck, and a protective hood in the form of an inverted cup coaxial with the locking member to cover substantially all but the neck receiving end of the locking member, and means for connecting the hood to the locking member and to the second member to be sealed, said last named means including an outwardly directed flange on the bottom of the hood and an outwardly directed flange on the bottom of the locking member, the locking member being inserted upwardly through an aperture in the second member to be sealed, the flanges on the hood and locking member being affixed on opposite sides of the second member to be sealed, one of such flanges having spaced tangs piercing such second member, the outer ends of the tangs contacting and interlocking with the other edge of the other flange, the height of the neck portion of the male part below the shoulder thereon, and the height of the locking member of the female part both being such that when the lock seal parts are lockingly engaged, as recited, the first and second members sealed thereby lie close together.

7. In the combination of a first member and a second member to be sealed thereto and a lock seal having a male part and a female part, one such part being affixed to the first member and the other such part being affixed to the second member, the improved lock seal in which the male part has an upstanding neck portion, said neck portion having a substantially downwardly facing shoulder near a first end thereof, the first member being affixed to the end of the male part remote from the shoulder, the neck of the male portion extending substantially at right angles to the extent of the first member, and the female part comprises a continuous tubular locking member having a bottom diameter slightly larger than that of the largest portion of the neck so as to receive the neck within it, said locking member having a plurality of upwardly extending prongs affixed thereto at their lower ends, said prongs lying generally on the frustum of a cone so as to extend inwardly toward the axis of the locking member, whereby when the male member is inserted upwardly into the female member the top edges of the prongs engage the shoulder on said neck, and a protective hood in the form of an inverted cup coaxial with the locking member to cover substantially all but the neck receiving end of the locking member, and means for connecting the hood to the locking member and to the second member to be sealed, said last named means including an outwardly directed horizontal flange on the bottom of the hood and an outwardly directed horizontal flange on the bottom of the locking member, the locking member being inserted upwardly through an aperture in the second member to be sealed, the flange on the hood being positioned on top of such second member and the flange on the locking member being positioned on the bottom of such second member, the flange on the hood having spaced tangs downwardly piercing such second member, the outer ends of the tangs contacting and interlocking with the outer edge of the flange on the locking member, the height of the neck portion of the male part below the shoulder thereon, and the height of the locking member of the female part both being such that when the lock seal parts are lockingly engaged, as recited, the upper surfaces of the inbent ends of the tangs on the flange on the male part lie close to the lower surfaces of the ends of the tangs on the flange of the hood and to the lower surface of the flange on the locking member.

8. In the combination of a first member and a second member to be sealed thereto and a lock seal having a male part and a female part, one such part being affixed to the first member, the improved lock seal in which the male part has an upstanding neck portion, said neck portion having a substantially downwardly facing shoulder near a first end thereof, the first member being affixed to the end of the male part remote from the shoulder, the neck of the male portion extending substantially at right angles to the extent of the first member, and the female part comprises a continuous tubular locking member having a bottom diameter slightly larger than that of the largest portion of the neck so as to receive the neck within it, said locking member having a plurality of upwardly extending prongs affixed thereto at their lower ends, said prongs lying generally on the frustum of a cone so as to extend inwardly toward the axis of the locking member; whereby when the male member is inserted upwardly into the female member the top edges of the prongs engage the shoulder on said neck, and a protective hood in the form of an inverted cup coaxial with the locking member to cover substantially all but the neck receiving end of the locking member, and means for connecting the hood to the locking member and to the second member to be sealed, said last named means including an outwardly directed horizontal flange on the bottom of the hood and an outwardly directed horizontal flange on the bottom of the locking member, the locking member being inserted upwardly through an aperture in the second member to be sealed, the flange on the hood being positioned on top of such second member and the flange on the locking member being positioned on the bottom of such second member, the flange on the hood having spaced tangs downwardly piercing such second member, the outer ends of the tangs being bent inwardly in a direction generally radial of the female part to overlie and tightly engage the outer edge of the flange of the locking member, such edge of the last named flange having an offset upwardly at the points of contact between it and the tangs so that the side and end edges of the tangs lie substantially flush with the main bottom surface of said flange on the locking member, the height of the neck portion of the male part below the shoulder thereon, and the height of the locking member of the female part both being such that when the lock seal parts are lockingly engaged, as recited, the upper surface of the first member to be sealed lies close to the lower surface of the inbent ends of the tangs on the flange on the hood and to the bottom surface of the second member to be sealed.

9. In the combination of a first member and a second member to be sealed thereto and a lock seal having a male part and a female part, one such part being affixed to the first member and the other such part being affixed to the second member, the improved lock seal in which the male part has an upstanding neck portion, said neck portion having a substantially downwardly facing shoulder near a first end thereof, the first member being affixed to the end of the male part remote from the shoulder, the neck of the male portion extending substantially at right angles to the extent of the first member, and the female part comprises a continuous tubular locking member having a bottom diameter slightly larger than that of the largest portion of the neck so as to receive the neck within it, said locking member having a plurality of upwardly extending prongs affixed thereto at their lower ends, said prongs lying generally on the frustum of a cone so as to extend inwardly toward the axis of the locking member, whereby when the male member is inserted upwardly into the female member the top edges of the prongs engage the shoulder on said neck, and a protective hood in the form of an inverted cup coaxial with the locking member to cover substantially all but the neck receiving end of the locking member, and means for connecting the hood to the locking member and to the second member to be sealed, said last named means including an outwardly directed horizontal flange on the bottom of the hood and an outwardly directed horizontal flange on the bottom of the locking member, the locking member being inserted upwardly through an aperture in the second member to be sealed, the flange on the hood being positioned on top of such second member and the flange on the locking member being positioned on the bottom of such second member, the flange on the hood having spaced tangs downwardly piercing such second member, the outer edge of the flange on the locking member being bent concavely downwardly at locations where the flange confronts the tangs, the outer ends of the tangs being bent upwardly into such upwardly bent portions of the flange to tightly engage the same end so that the outer edges of the tangs lie vertically above the main bottom surface of the flange on the locking member, the height of the neck portion of the male part below the shoulder thereon, and the height of the locking member of the female part both being such that when the lock seal parts are lockingly engaged, as recited, the upper surface of the first member to be sealed lies close to the lower surfaces of the inbent ends of the tangs on the flange on the hood and to the bottom surface of the second member to be sealed.

ARTHUR H. SWETT, JR.
EDWARD C. MARSHALL.

REFERENCES CITED

The following references are of record in the file of this patent:

UNITED STATES PATENTS

| Number | Name | Date |
|---|---|---|
| 622,164 | Pfenning | Mar. 28, 1899 |
| 1,205,049 | Snyder | Nov. 14, 1916 |
| 2,028,423 | Upham | Jan. 21, 1936 |